United States Patent
Starr

[15] 3,648,765
[45] Mar. 14, 1972

[54] TEMPERATURE CONTROL SYSTEM FOR SPACE SUIT

[72] Inventor: James B. Starr, St. Paul, Minn.
[73] Assignee: The United States of America as represented by the Secretary of the Navy
[22] Filed: Nov. 24, 1970
[21] Appl. No.: 92,469

[52] U.S. Cl...............................165/39, 165/46, 165/107, 165/108, 236/34.5, 62/259
[51] Int. Cl. .......................................................G05d 23/00
[58] Field of Search........................165/46, 107, 108, 39, 32; 123/41.09, 41.10; 236/34.5; 2/2.1; 62/259

[56] References Cited

UNITED STATES PATENTS

| | | |
|---|---|---|
| 2,915,298 | 12/1959 | Hamlin et al.........................165/36 X |
| 3,080,857 | 3/1963 | Middendorf.......................165/107 X |
| 3,160,346 | 12/1964 | Kimm ...............................236/34.5 X |
| 3,255,740 | 6/1966 | Walsh.................................123/41.09 |
| 3,367,319 | 2/1968 | Carter........................................2/2.1 |
| 3,510,060 | 5/1970 | Starmuhler..........................236/34.5 |

Primary Examiner—Albert W. Davis, Jr.
Attorney—R. S. Sciascia, H. H. Losche and Paul S. Collignon

[57] ABSTRACT

A temperature control system for a space suit having a warm fluid loop and a cold fluid loop with a mixing valve for adding fluid in the cold loop with fluid in the warm loop. A sensor is provided to control a throttle in the cold fluid loop for regulating the amount of fluid being added from the cold loop to the warm loop.

2 Claims, 2 Drawing Figures

INVENTOR.
JAMES B. STARR

TEMPERATURE CONTROL SYSTEM FOR SPACE SUIT

CROSS-REFERENCES TO RELATED APPLICATIONS

Patent application of James B. Starr entitled, TEMPERATURE SENSOR FOR SPACE SUIT, Ser. No. 96,874, filed Dec. 10, 1970.

BACKGROUND OF THE INVENTION

The present invention relates to a system for controlling body temperature of a pilot or astronaut, and more particularly relates to a temperature control system for a garment.

Liquid-cooled garments have been developed for use as flight suits or space suits and generally consist of a net fabric interwoven with small diameter plastic tubing for carrying fluid. For example, in U.S. Pat. No. 3,289,748, which issued Dec. 6, 1966, to David C. Jennings, there is shown an undergarment including flexible liquid cooling conduits mounted on a net fabric in such a fashion as to be in contact with the skin of the wearer so as to cool the body by direct conduction of heat. This cooling technique is fundamentally different from the older gas-cooling method in which heat is removed primarily by evaporation of perspiration. Liquid-cooled garments are generally operated at temperatures low enough to suppress perspiration, thereby providing adequate cooling without danger of dehydration. The rate of heat removal by liquid-cooled garments is primarily a function of liquid temperature. Correct body thermal regulation therefore requires adjustment of coolant temperature as metabolic rate and external thermal loads vary. Gas cooling, by contrast, tends to be self-regulating because the body is able to modulate the cooling rate automatically by varying perspiration rate. Use of a liquid-cooled garment, therefore, requires additional attention to coolant temperature adjustment to obtain a satisfactory thermal state.

Available liquid-cooled garments provide overall temperature control and rely on the person wearing the garment to regulate coolant temperature to achieve a satisfactory thermal state. In critical operational situations, however, the person wearing the garment may not have time to concern himself with his own comfort and his performance may be impaired precisely when maximum effectiveness is required. Thermal discomfort may also arise from localized external thermal loads as, for example, those caused by radiation from a warm cockpit canopy. In this case, zoned temperature control would be desirable, but manual operation of such a system would excessively encumber a person wearing the garment.

SUMMARY OF THE INVENTION

The present invention relates to a control system for a liquid-cooled garment wherein the temperature of the liquid flowing in the garment is modulated by mixing warm and cold streams of water in various proportions. A refrigeration system is used to generate a cold fluid supply and body heat is used to generate a source of warm fluid by continually recirculating fluid through the garment without removing heat. The system consists of two principal loops. A warm fluid loop is provided which includes the garment circulating passages, a mixing valve and a pump, and a cold fluid loop is provided which includes a refrigeration system, a throttle valve and a pump. If no fluid flows from the cold loop to the warm loop, then the temperature of the fluid in the warm loop will increase and approach the mean skin temperature of the subject. When cooling is desired, a quantity of cold fluid is fed through a cold fluid throttle into the warm loop. In order to maintain continuity, an equal quantity of fluid flows out of the warm loop through a crossover line into the cold loop. The quantity of cold fluid entering the warm loop is modulated by a throttle valve which operates in response to a skin-temperature sensing element.

DESCRIPTION OF THE PREFERRED EMBODIMENT

Figure 1:
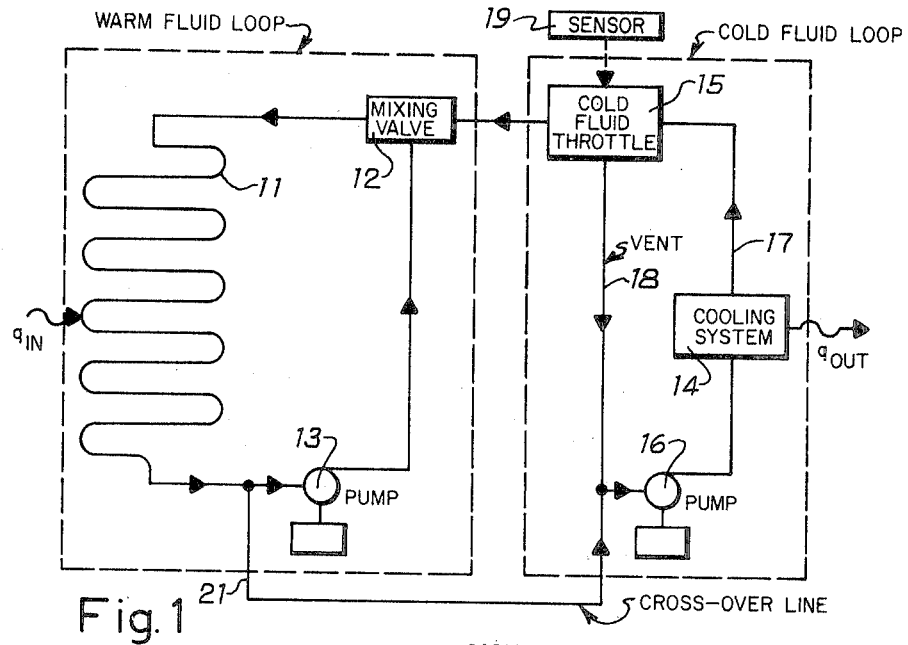
FIG. 1 is a diagrammatic view of the invention showing a warm fluid loop and a cold fluid loop.

Referring now to FIG. 1 of the drawing, there is shown a cooling system for a garment having a warm fluid loop and a cold fluid loop. The warm fluid loop has plastic tubing 11 which has one end connected to a mixing valve 12. A pump 13 is provided to circulate fluid inside the tubing and through mixing valve 12. The cold fluid loop has a cooling system 14, throttle valve 15, and pump 16, and fluid, such as water, is circulated through appropriate tubing 17. If no fluid flows from the cold loop to the warm loop, the temperature of the fluid in the warm loop will increase and approach the mean skin temperature of the person wearing the garment. When cooling is desired, a quantity of cold fluid is fed through throttle valve 15 into the warm loop. All cold fluid entering throttle valve 15 and not passing on to mixing valve 12 is returned to the cooling system 14 by tubing 18 and pump 16. The quantity of cold fluid entering the warm loop is modulated by throttle valve 15 which operates in response to a sensor 19. Sensor 19 might be of the type which is more fully described in the above-referenced patent application. In order to maintain continuity between the warm fluid loop and the cold fluid loop, a quantity of fluid equal to the quantity of cold fluid entering mixing valve 12 flows out of the warm loop through a crossover line 21 and into the cold loop. The rate of cooling in the garment varies nonlinearly with the amount of cold fluid fed into the warm loop.

Figure 2:
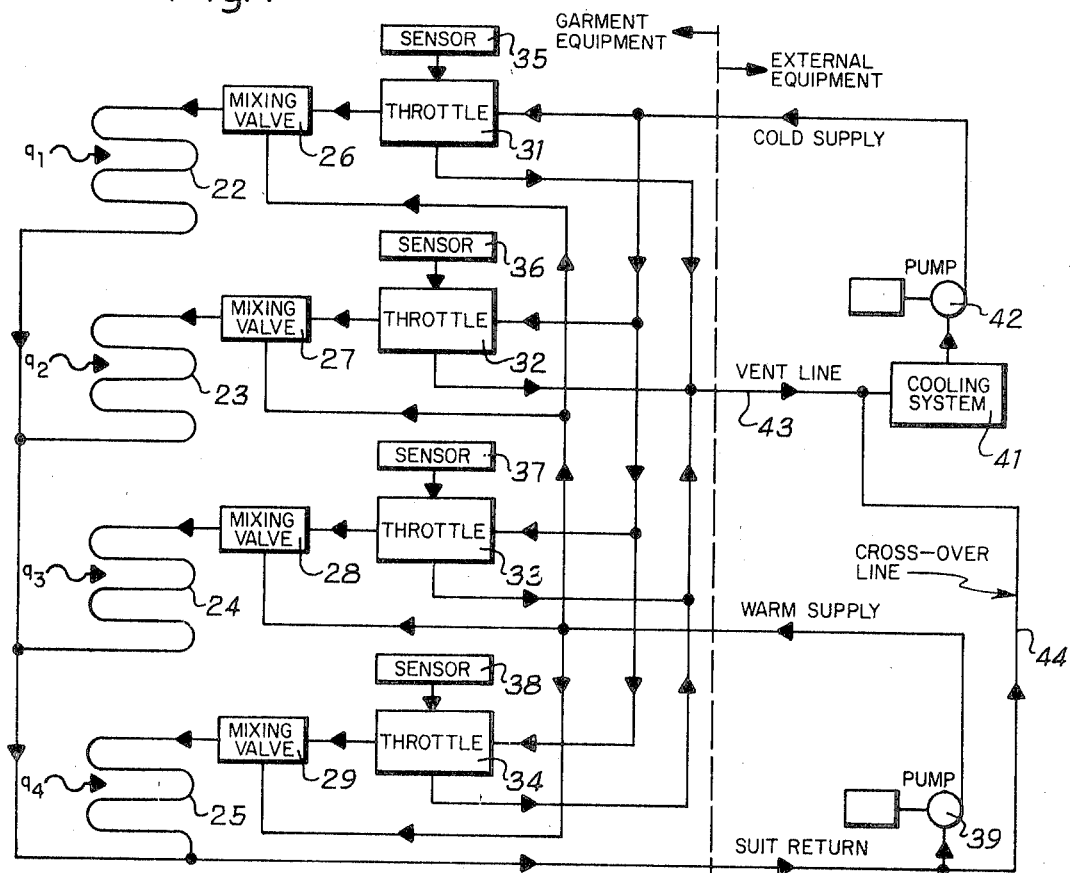
FIG. 2 is a diagrammatic view showing a preferred embodiment of the present invention.

Referring now to FIG. 2 of the drawing, there is shown a temperature control system for a garment having four zones of cooling. Plastic tubings 22, 23, 24, and 25 are provided in different zones of the garment and these tubings are connected to mixing valves 26, 27, 28, and 29, respectively. These mixing valves receive cold fluid through throttles 31–34 which are controlled by sensors 35–38, respectively. Fluid flowing through tubings 22–25 is warmed by body heat and then returns to mixing valves 26 through 29 by pump 39. A cooling system 41 is provided in the cold fluid loop, and pump 42 supplies cold fluid to throttles 31 through 34. The portion of cold fluid which does not flow to the various mixing valves flows back to cooling system 41 by way of cent line 43. In order to maintain continuity between the warm fluid loop and the cold fluid loop, a quantity of fluid equal to the quantity of cold fluid entering mixing valves 26 through 29 flows out of the warm loop through a crossover line 44 to cooling system 41.

In operation, sensors 35 through 38 are placed adjacent the skin of a person wearing a garment and these sensors control throttles 31 through 34. A greater or lesser amount of cooling fluid is passed by the various throttles as directed by the sensors. The cooling fluid is mixed with warm fluid in the mixing valves and then flows through a particular tubing to cool the zone of the body in which that particular tubing is located. It is possible that a different amount of cooling can be provided in each zone. The rate of cooling in each zone of the garment varies nonlinearly with the amount of cold fluid fed into the tubing in that particular zone. As cold fluid enters the warm loop, the garment outlet temperature, which is equal to the warm-supply temperature, is reduced. Consequently, the temperature of the fluid flowing in tubings 22 through 25 is reduced by introduction of the cold fluid and, in addition, by reduction of the warm-supply temperature.

I claim:

1. A temperature control system in a garment comprising, a plurality of cooling tubes for carrying fluid, each tube having an input end and an output end, a supply of cold fluid, a plurality of mixing valves equal in number to the number of said cooling tubes, the input end of each said cooling tube being connected to a separate mixing valve, a plurality of throttles, one each connected between each said mixing valve and said supply of cold fluid, a return tube connected between the output ends of each cooling tube and each said mixing valve for supplying warm fluid to said mixing valves, and a plurality of temperature sensors connected one each to each said throttle for controlling the flow of cold fluid by said throttle to the mixing valve connected thereto.

2. A temperature control system in a garment as set forth in claim 1 having a cooling system and a crossover line connected between said return tube and said cooling system whereby said supply of cold fluid is recirculated.

* * * * *